(12) United States Patent
Poscher et al.

(10) Patent No.: US 11,922,818 B2
(45) Date of Patent: Mar. 5, 2024

(54) UAV FLIGHT CORRIDOR ALLOCATION IN CELLULAR NETWORKS

(71) Applicant: Telefonaktiebolaget LM Ericsson (publ), Stockholm (SE)

(72) Inventors: Jens Poscher, Aachen (DE); Ralph Detke, Herzogenrath (DE); Stefan Eichinger, Pulheim (DE); Pedro Tercero, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 568 days.

(21) Appl. No.: 17/051,564

(22) PCT Filed: May 3, 2018

(86) PCT No.: PCT/EP2018/061387
§ 371 (c)(1),
(2) Date: Oct. 29, 2020

(87) PCT Pub. No.: WO2019/210962
PCT Pub. Date: Nov. 7, 2019

(65) Prior Publication Data
US 2021/0225174 A1 Jul. 22, 2021

(51) Int. Cl.
*G08G 5/00* (2006.01)
*B64C 39/02* (2023.01)
(Continued)

(52) U.S. Cl.
CPC ........... *G08G 5/003* (2013.01); *B64C 39/024* (2013.01); *B64U 70/00* (2023.01); *G08G 5/0013* (2013.01);
(Continued)

(58) Field of Classification Search
CPC ...... G08G 5/003; G08G 5/0013; G08G 5/006; G08G 5/0069; G08G 5/0026;
(Continued)

(56) References Cited

U.S. PATENT DOCUMENTS

2017/0178518 A1 6/2017 Foladare et al.
2017/0285633 A1* 10/2017 Poornachandran .. G05D 1/0022
(Continued)

*Primary Examiner* — Shon G Foley
(74) *Attorney, Agent, or Firm* — Murphy, Bilak & Homiller, PLLC

(57) ABSTRACT

A system, method, node, apparatus, and computer program for allocating a flight corridor for use by an UAV (10) for traveling from a starting point to a destination point is presented. The UAV (10) is connected to a cellular network and associated with an Application Server, UAV-AS, (100) being responsible for an own geographical service area (150) where the UAV (10) is located. The UAV-AS (100) is maintaining a set of predetermined flight corridor segments in the geographical service area (150). The method is performed by the UAV-AS (100) and comprises receiving a request for allocation of a flight corridor for use by the UAV (10), the request comprising a starting point and a destination point. The method further comprises allocating a flight corridor being seamlessly covered by the cellular network and allowing a seamless control of the UAV (10) by the UAV-AS (100), the flight corridor comprising a concatenation of flight corridor segments and bridging the starting point and the destination point. The method also comprises sending a response comprising an identifier of the allocated flight corridor.

18 Claims, 10 Drawing Sheets

(51) Int. Cl.
*B64U 70/00* (2023.01)
*B64U 10/13* (2023.01)

(52) U.S. Cl.
CPC ........... *G08G 5/006* (2013.01); *G08G 5/0069* (2013.01); *B64U 10/13* (2023.01); *B64U 2201/00* (2023.01)

(58) Field of Classification Search
CPC .. G08G 5/0034; G08G 5/0043; G08G 5/0082; B64C 39/024; B64U 10/13; B64U 2201/00; H04B 7/18506
See application file for complete search history.

(56) References Cited

U.S. PATENT DOCUMENTS

2018/0061251 A1 3/2018 Venkatraman et al.
2018/0375568 A1* 12/2018 De Rosa ............ H04B 7/18506

\* cited by examiner flight corridor segments
in a geographical service area

UAV block flows

UAV FLIGHT CORRIDOR ALLOCATION IN CELLULAR NETWORKS

TECHNICAL FIELD

The present invention relates to telecommunications and in particular to a system, method, node and computer program for allocating a flight corridor for use by an unmanned aerial vehicle, UAV, for traveling from a starting point to a destination point.

BACKGROUND

New delivery services or emergency services will require specific unmanned aerial vehicle, UAV, to transport products or to perform surveillance.

UAV usage is typically regulated, and a cellular network architecture can be used to enforce network policies by a central authority for e.g. flight space restriction (static or dynamically), travel speed, flight tracks/paths, and there like.

An architecture presented here is based on a dedicated UAV-Application Server, UAV-AS, that is used by any UAV using a specific cellular network when the UAV is activated. The UAV-AS is under the administrative domain of the operator and is automatically detected and connected to the cellular network, when the UAV-AS is taken into service.

Flight regulation may differ in real-time depending on different geographical locations of the UAV and need to be enforced when certain borders are crossed. For example, a UAV is flying from one country to another (e.g. a delivery service) or from unrestricted air space in a single country to a restricted air space (e.g. a residential area, stadium, or other limited air space) controlled by another UAV-AS.

Coordination and flight policy enforcement of UAV traffic is handled by the UAV-AS for an autonomous service area e.g. per country by a flight regulation agency. A country regulator might not want to expose details of its inner service area to other external authorities.

To always be in control of the UAV e.g. for positioning, steering, control, and policy management, all UAV need to be connected via an UAV-AS to a cellular network at all times. Such cellular network may for example be operated by a mobile network operator. The UAV may carry prioritized goods or provide important emergency visual surveillance and must therefore always be within radio coverage to allow control, secure the flight of the UAV, or for upload of obtained surveillance information.

Flight paths are usually defined from a start location (A) to a destination location (B) by the end service user of the UAV and are transparent to the requesting delivery/surveillance service provider using for example a UAV-AS northbound application programming interface, API, to request the service.

Each flight path is divided into concatenated three-dimensional flight corridors, similar to a street map. Each corridor belongs to airspace of a single autonomous UAV-AS service area. Flight corridors leading to an adjacent UAV-AS service area may be connected to adjacent flight corridors by a so-called Point of Interconnect (POI).

Commercial UAV service providers (packet delivery, public safety, surveillance) may request clearance of a UAV flight between a point A and a point B in a single AS service area or via multiple regulated and autonomous service areas for the requested flight, for example between countries or regions.

SUMMARY

There is a clear need for a method and corresponding system and apparatus for allocating a flight corridor for use by an UAV for traveling from a starting point to a destination point. This object is achieved by the independent claims. Advantageous embodiments are described in the dependent claims.

According to an exemplary aspect of the invention, a method for allocating a flight corridor for use by an unmanned aerial vehicle, UAV, for traveling from a starting point to a destination point is presented. The UAV is connected to a cellular network and associated with a UAV-Application Server, UAV-AS, being responsible for an own geographical service area where the UAV is located. The UAV-AS is maintaining a set of predetermined flight corridor segments in the geographical service area. The method is performed by the UAV-AS and comprises receiving a request for allocation of a flight corridor for use by the UAV, the request comprising a starting point and a destination point. The method further comprises allocating a flight corridor being seamlessly covered by the cellular network and allowing a seamless control of the UAV by the UAV-AS, the flight corridor comprising a concatenation of flight corridor segments and bridging the starting point and the destination point and sending a response comprising an identifier of the allocated flight corridor.

According to a further exemplary aspect of the invention, a method for allocating a flight corridor for use by an unmanned aerial vehicle, UAV, for traveling from a starting point to a destination point is presented. The UAV is connected to a cellular network and associated with a UAV-Application Server, UAV-AS, being responsible for an own geographical service area where the UAV is located. The UAV-AS is maintaining a set of predetermined flight corridor segments in the geographical service area. The method is performed by the UAV and comprises sending a request to the UAV-AS for allocation of a flight corridor for use by the UAV, the request comprising a starting point and a destination point and receiving a response to the request, comprising an identifier of the allocated flight corridor, wherein the allocated flight corridor is seamlessly covered by the cellular network and allowing a seamless control by the UAV-AS.

According to a further exemplary aspect of the invention, an Application Server, UAV-AS adapted for allocating a flight corridor for use by an unmanned aerial vehicle, UAV, for traveling from a starting point to a destination point is presented. The UAV is connected to a cellular network and associated with the UAV-AS, being responsible for an own geographical service area where the UAV is located. The UAV-AS is maintaining a set of predetermined flight corridor segments in the geographical service area. The UAV-AS is adapted to receive a request for allocation of a flight corridor for use by the UAV, the request comprising a starting point and a destination point. The UAV-AS is further adapted to allocate a flight corridor being seamlessly covered by the cellular network and allowing a seamless control of the UAV by the UAV-AS, the flight corridor comprising a concatenation of flight corridor segments and bridging the starting point and the destination point and to send a response comprising an identifier of the allocated flight corridor.

According to a further exemplary aspect of the invention, an unmanned aerial vehicle, UAV, adapted for allocating a flight corridor for use by an unmanned aerial vehicle, UAV, for traveling from a starting point to a destination point is presented. The UAV is connected to a cellular network and associated with a UAV-Application Server, UAV-AS, being responsible for an own geographical service area where the UAV is located. The UAV-AS is maintaining a set of predetermined flight corridor segments in the geographical service area. The UAV is adapted to send a request to the UAV-AS for allocation of a flight corridor for use by the UAV, the request comprising a starting point and a destination point and to receive a response to the request, comprising an identifier of the allocated flight corridor, wherein the allocated flight corridor is seamlessly covered by the cellular network and allowing a seamless control by the UAV-AS.

According to a further exemplary aspect of the invention, a system adapted for allocating a flight corridor for use by an unmanned aerial vehicle, UAV, for traveling from a starting point to a destination point is presented. The UAV is connected to a cellular network and associated with a UAV-Application Server, UAV-AS, being responsible for an own geographical service area where the UAV is located. The UAV-AS is maintaining a set of predetermined flight corridor segments in the geographical service area. The system comprises a UAV-AS and a plurality of UAV.

Also provided is a computer program product comprising program code portions to perform the steps of any of the methods presented herein when executed on one or more processors. The computer program product may be stored on computer readable recording medium such as a semiconductor/flash memory, DVD, and so on. The computer program product may also be provided for download via a communication connection.

The foregoing and other objects, features and advantages of the present invention will become more apparent in the following detailed description of embodiments of the invention illustrated in the accompanying drawings.

BRIEF DESCRIPTION OF THE DRAWINGS

Further characteristics and advantages of the invention will become better apparent from the detailed description of particular, but not exclusive embodiments, illustrated by way of non-limiting examples in the accompanying drawings, wherein.

DETAILED DESCRIPTION

Figure 1:
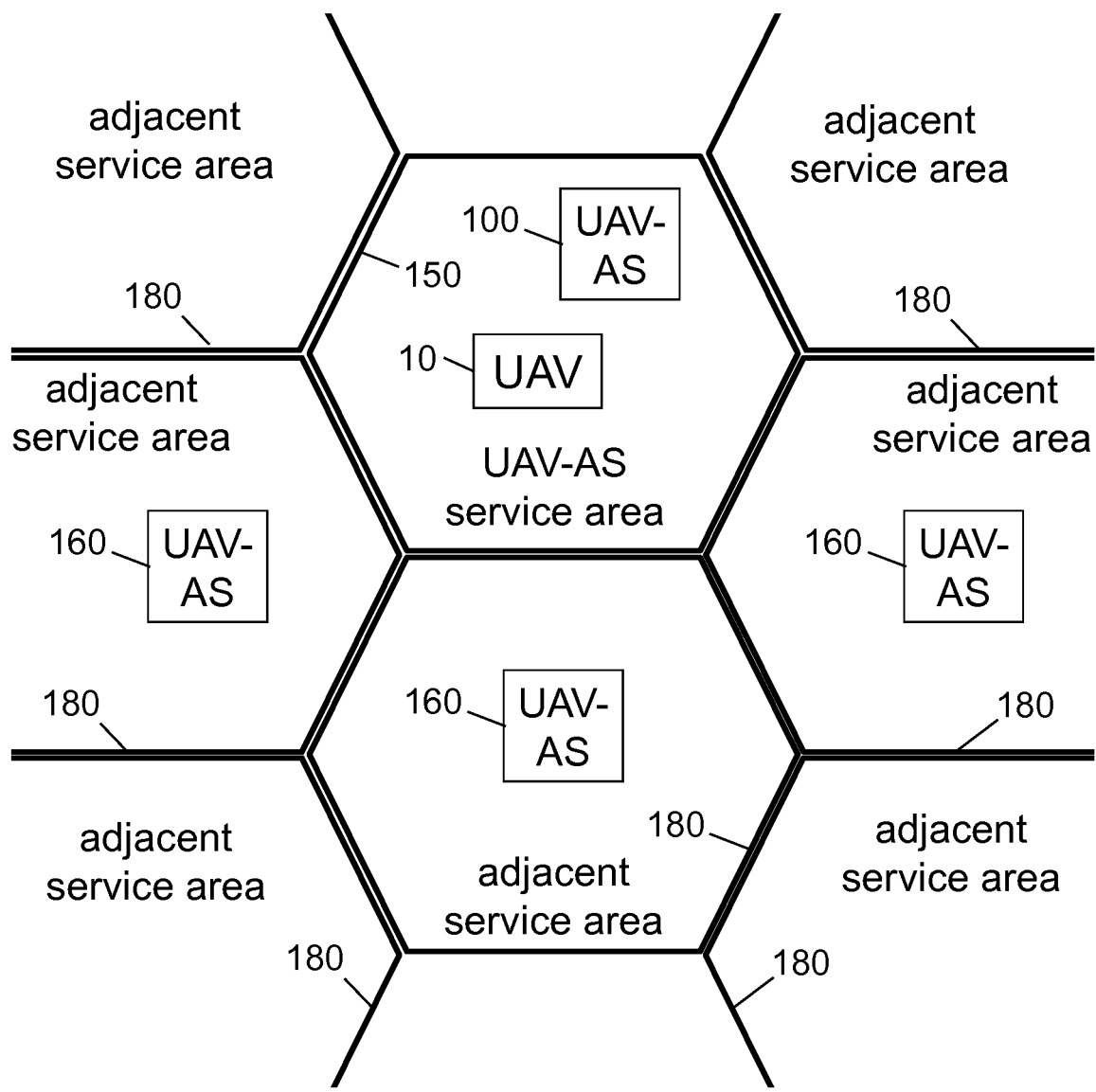
FIG. 1 shows a diagram illustrating a system for allocating a flight corridor for use by an UAV for traveling from a starting point to a destination point comprising a UAV-AS responsible for a geographical service area.

In the following, a system, methods, nodes, and computer programs for allocating a flight corridor for use by an UAV for traveling from a starting point to a destination point according to the invention are described in more detail.

In the following description, for purposes of explanation and not limitation, specific details are set forth in order to provide a thorough understanding of the present disclosure. It will be apparent to one skilled in the art that the present disclosure may be practiced in other implementations that depart from these specific details. For example, while the following implementations will be described with regard to LTE and 5G architectures, it will be understood that the present disclosure shall not be limited to these architectures and that the technique presented herein may be practiced with other cellular network architectures as well. A cellular network may be a wireless network using radio-based communication towards their client.

Those skilled in the art will further appreciate that the steps, services, and functions explained herein below may be implemented using individual hardware circuitry, using software functioning in conjunction with a programmed microprocessor or general-purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories are encoded with one or more programs that perform the steps, services and functions disclosed herein when executed by the one or more processors.

Within the context of the present application, the term "Unmanned Aerial Vehicle", or UAV in short, refers to an automatic device or machine, that can move in any given environment. UAV is considered synonym with "drone", or "mobile robot". Mobile robots have the capability to move around in their environment, thus they are not fixed to one physical location. In contrast, industrial robots usually consist of a jointed arm (multi-linked manipulator) and gripper assembly (or end effector) that is attached to a fixed surface while in operation. A mobile robot may be classified by the environment in which it moves:
- Land or home robots are usually referred to as Unmanned Ground Vehicles. They are most commonly wheeled or tracked, but also include legged robots with two or more legs (humanoid or resembling animals or insects).
- Aerial robots are usually referred to as Unmanned Aerial Vehicles, UAV.
- Underwater robots are usually called Autonomous Underwater Vehicles or Unmanned Submarine Vessel.
- Water surface based mobile robots are usually referred to as Unmanned Marine Vehicles.

The above listed vehicles are the types of vehicles that move autonomously, so without human pilot, on a programmed or instructed path or towards an instructed geographical position/destination or may also be steered and controlled remotely. The vehicle may also carry human passengers, but wherein none of these passengers would be involved in steering the vehicle. The vehicle may comprise a pilot or driver, but the vehicle would operate in an autonomous movement mode where the driver or pilot is released from the actual steering task. Autonomous driving cars or auto-pilot flight mode in aircrafts or ships would also be examples covered by the term UAV.

These vehicles could operate respectively in the air, on land, underground, on sea and inland waters, in space or even on other planets/asteroids. The vehicles have an own engine respectively jet, propeller, wheel, crawler track, propeller screw, or hover propulsion and gear. The vehicles have the ability of exchanging data with each other and/or to a controlling base (such as a UAV-AS) wirelessly. A ground based cellular or wireless communication network may be employed to enable such data exchange. Such a communication network may be run by a mobile operator and thus a communication between a UAV and a controlling ground station may take place using the data communication services of that communication network.

UAV may be deployed for transportation of goods, e.g. for delivery of parcels from a reseller or shop to the end customer. They may also be used for postal services, mail delivery, or surveillance tasks.

Within the context of the present application, the term "geographical service area" or "service area" refers to a region under a common administration/authority. In the context of UAV and flight corridor allocation, this refers to a geographical area where certain flight policies, access policies, or certain flight corridor segment definitions are applicable. Such flight policy is typically issued by an authorized (e.g. governmental) office/agency being responsible for a save and controlled usage of UAVs in that region (flight safety authority).

Such a geographical service area would be characterized by the applicable flight policy and related flight corridor segment definitions being deposited in an application server, AS, and thereby made accessible for anyone deploying UAVs in that region. The AS may be physically located in that area or may be centralized (instantiated) somewhere in a remote/central data center (e.g. in a "cloud") or may be implemented by a virtual network function. Even if the AS (or AS instance) may be distant to the geographical service area, still the geographical service area would be tied to one (logical) AS (instance), thus the AS can be queried for getting access to the applicable information.

Typically, such authorized (e.g. governmental) office/agency takes autonomous decisions on local flight policies in accordance with the local legislation. Flight policies and related flight corridor segment definitions may also comprise UAV categories (e.g. weight classes), dynamic policies (e.g. depending on time of the day or flight density in that area) or may consider access priorities (e.g. premium delivery service, or emergency/disaster recovery services).

A geographical service area may also be composed of one or more sub-areas of different nature. Although the geographical service area as such is a legislative region (where a flight policy is applicable), such sub-areas may be radio coverage areas used in the cellular/wireless communication network such as tracking areas, radio cells, location areas, routing areas, or segments of a grid or geofence defined by e.g. GPS coordinates.

Within the context of the present application, the term "cellular network" may denote a wireless communication network, or particularly denote a collection of nodes or entities, related transport links, and associated management needed for running a (communication) service, for example a wireless telephony service or a wireless packet transport service. Depending on the service, different node types or entities may be utilized to realize the service. A network operator owns the cellular network and offers the implemented services to its subscribers. Typical components of a wireless/cellular communication network are radio access network (such as 2G, GSM, 3G, WCDMA, CDMA, LTE, 5G, NR, WLAN, Wi-Fi), mobile backhaul network, and core network (such as GPRS Core, EPC, 5G Core).

Within the context of the present application, the term "flight corridor segment" refers to a three-dimensional path that is permitted to be used by UAV traffic. Such corridor may be allowed to be used either in both directions, or only in one direction, i.e. one way. A flight path of a UAV may be characterized by direction, height, and position in such corridor. A flight corridor segment connects to one or more other flight corridor segment at the beginning and at the end. By alternative, a flight corridor segment may be connected to a starting point or destination point. In this case, UAVs could enter the flight corridor segment from a starting point or leave a flight corridor segment at a destination point. A flight corridor segment may also be connected to more than one further flight corridor segment. In this case, a UAV may enter the flight corridor segment from any of such connected further flight corridor segments or leave towards another flight corridor segment of these further flight corridor segments.

Within the context of the present application, the term "flight corridor" refers to a concatenation of flight corridor segment. It is noted, that the characteristics of connected flight corridor segment must be matched when determining a flight corridor. For example, it is meaningless to connect two flight corridor segments that are defined as one way and have opposite flight directions. Also, the position and height must be aligned at the joining point of flight corridor segments. A determination of a flight corridor thus requires consideration of several parameters.

Within the context of the present application, the term "starting point", "destination point" refers to a geographical point where the UAV may start, or respectively, land. Thus, this term refers to any geographical point that is suited to serve as a starting point for a UAV movement or as a destination point is such movement. Such starting point or destination point is typically suited to be used in a determination of a movement path between such points. For example, if a UAV is used for delivery of mail, then a starting point may be a mail delivery center that centrally collects mail for distribution, and the destination point may be a recipient of such mail that is subject for delivery. By alternative, the starting point may also be the originator of such mail, in case of direct delivery from sender to recipient. A landing point may in general be used as a starting point, or as a destination point.

Within the context of the present application, the term "Point of Interconnect, POI" refers to a geographical point where two flight corridors of two adjacent geographical service areas are joined. A POI allows a UAV to move from a flight corridor of a first geographical service area to a corridor of a second geographical service area. Between two adjacent geographical service areas, UAV flight traffic is handed over at one or more of such POI. If there is no POI defined, a UAV cannot enter that adjacent geographical service area. Correspondingly, UAV transit traffic enters the geographical service area at a first POI and leaves the geographical service area at a second POI, thus is transit to the geographical service area, i.e. has no starting and destination point within the geographical service area.

Referring to FIG. 1, this figure shows a diagram illustrating a system for allocating a flight corridor for use by an UAV for traveling from a starting point to a destination point comprising a UAV-AS responsible for a geographical service area.

A UAV-AS 100 is assumed to be responsible for a geographical area, here called UAV-AS service area 150 covering a certain geographical area. The UAV-AS 100 maintains a flight policy and flight corridor segment definitions applicable for the plurality of UAV 10 being present in that geographical area the UAV-AS 100 is responsible for (i.e. the service area).

The geometrical shape of a UAV-AS service area 150 may depend on different factors. A basic shape could be a circle or elliptical shape. However, it is assumed that an entire geographical area (e.g. a country) is subject to one or more flight policies, and that if a UAV 10 is leaving a first service area, it immediately enters a second (here called adjacent) service area 180. The geometrical shape that best covers a larger region would be a square/rectangle or a hexagonal shape. For this reason, this figure sketches a scenario where the service area would be hexagonal shaped.

A service area may also be composed of one or more radio coverage areas used in the cellular network such as tracking areas, radio cells, location areas, routing areas, grids segments, or a geofenced area. In this case, the shape of the underlying radio coverage areas may implicitly determine the shape of the service area and is determined by radio wave propagation in a real-world condition.

A UAV 10 may be residing in a cellular network comprising a plurality of radio coverage areas and the geographical service area 150 is composed of one or more radio coverage areas used in the cellular network.

Although the UAV-AS 100 responsible for the geographical service area 150 is shown as located within that geographical service area 150, this shall be interpreted as a logical allocation of the UAV-AS 100 to the geographical service area 150, which may not be realized in the physical reality. There the UAV-AS 100 may be running in a central datacenter remote to the geographical service area 150. The same applies to the adjacent geographical service area 180 and the UAV-AS 160, 170 responsible therefore. In practice a UAV-AS 100 and a UAV-AS 160, 170 may run in the same central datacenter, however, still as separate entities.

Figure 2:
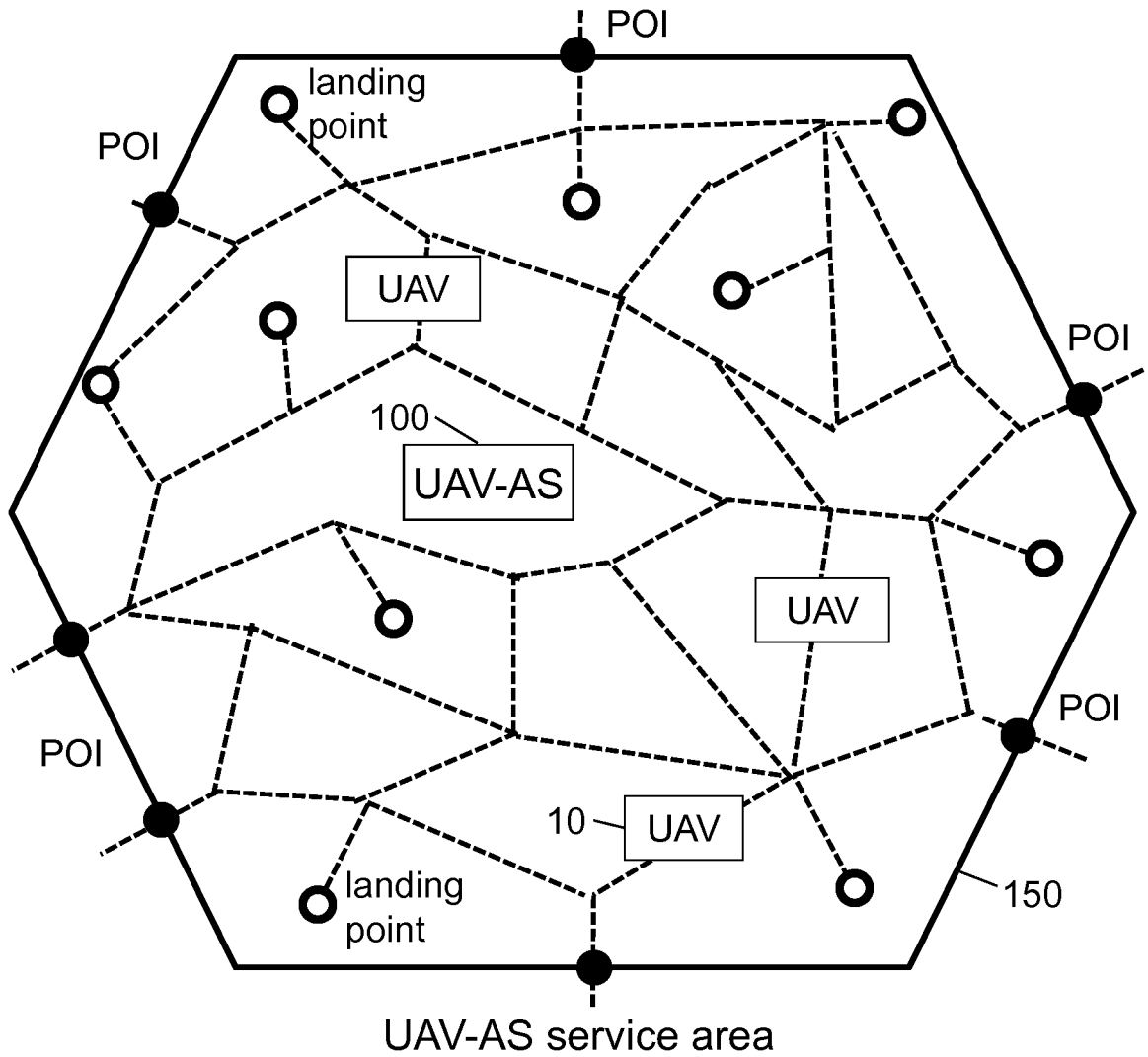
FIG. 2 shows an illustration of flight corridor segments in a geographical service area, comprising a plurality of UAV moving along flight corridors segments and a UAV-AS responsible for the geographical service area.

Referring to FIG. 2, this figure shows an illustration of flight corridor segments in a geographical service area, comprising a plurality of UAV moving along flight corridors segments and a UAV-AS responsible for the geographical service area.

A geographical service area 150 is under the responsibility of a UAV-AS 100. There is a plurality of UAV 10 being present in that geographical service area 150. A UAV 10 is traveling in a flight corridor segment, and the geographical service area 150 comprises a plurality of such flight corridor segments. Landing points may serve as starting point or destination point in a UAV travel mission. A landing point is connected via a flight corridor segment to the plurality of flight corridor segments.

For UAV travel missions that originate or are destined towards destinations outside of the geographical service area 150, the geographical service area 150 is connected to the flight corridor segments of adjacent geographical service areas 180 via one or more POI.

The responsible UAV-AS 100 may maintain a database of all flight corridor segments available in the geographical service area 150, and keep track on a load situation, and a radio coverage situation for each of these flight corridor segments.

Figure 3:
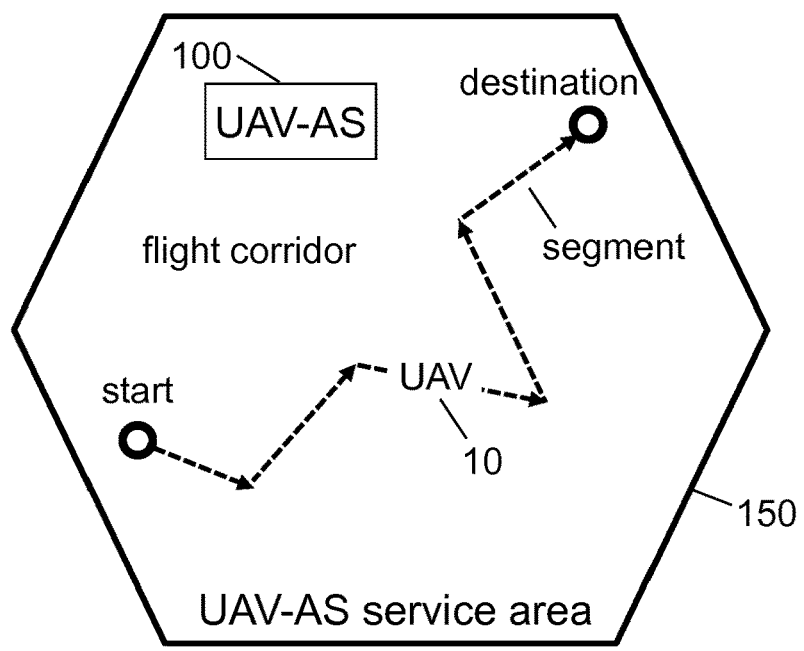
FIG. 3 shows an illustration of flight corridor from a starting point to a destination point within a geographical service area and a UAV-AS responsible for the geographical service area.

Referring to FIG. 3, this figure shows an illustration of flight corridor from a starting point to a destination point within a geographical service area and a UAV-AS responsible for the geographical service area.

In its simplest form, a UAV 10 travel mission is from a starting point to a destination point, wherein both, starting and destination point are within the geographical service area 150. The flight corridor comprises a concatenation of flight corridor segments bridging the starting point and the destination point.

In this situation, the UAV-AS 100, when receiving a request for allocation of a flight corridor, has all information available to perform the flight corridor determination and allocation. After having allocated such flight corridor, the UAV-AS 100 returns information comprising an indicating of the allocated flight corridor to the requestor.

The request may be received from a UAV 10 directly, or from an operator of the UAV 10. In the latter case, the operator of the UAV 10 will afterwards instruct the UAV 10 to take on the travel mission using the flight corridor that has been allocated to the flight mission.

Figure 4:
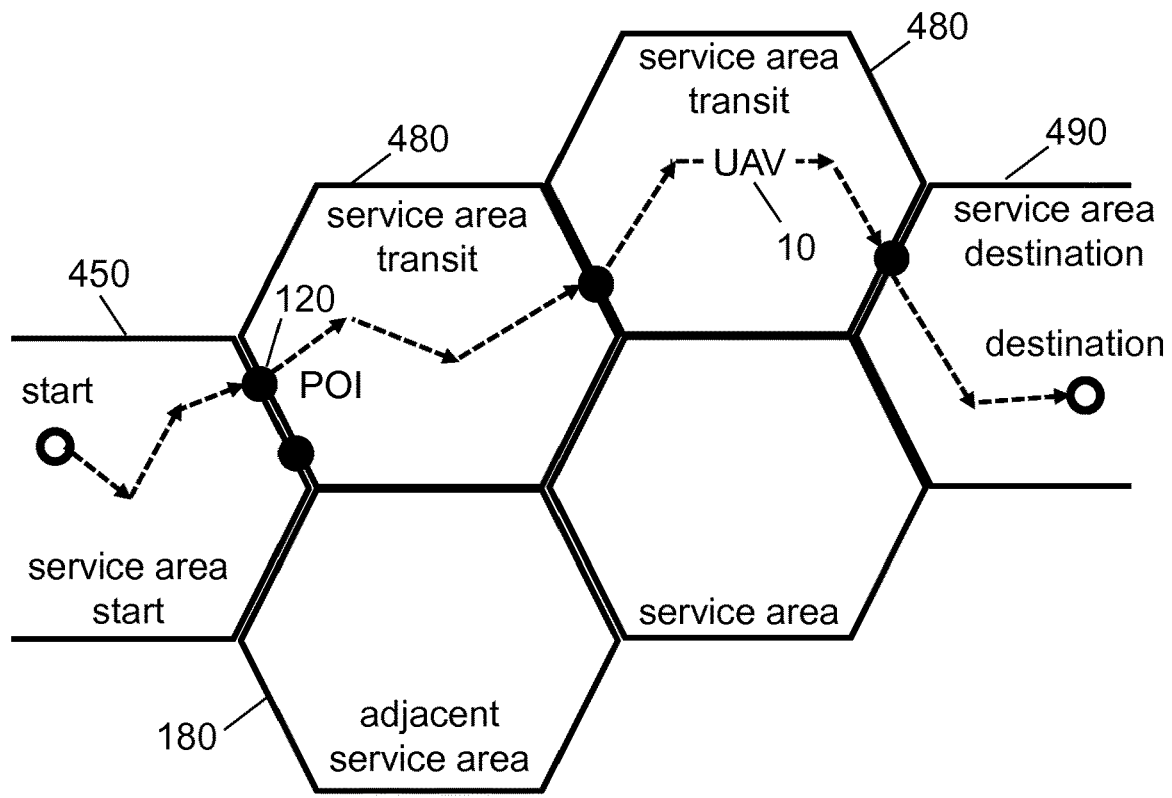
FIG. 4 shows an illustration of flight corridor from a starting point to a destination point where the flight corridor stretches from a starting service area, via two transit service areas, interconnected via POI, to a destination service area.

Referring to FIG. 4, this figure shows an illustration of flight corridor from a starting point to a destination point where the flight corridor stretches from a starting service area, via two transit service areas, to a destination service area.

In a more general case, a UAV 10 travel mission is from a starting point to a destination point, wherein at least one of both is located outside of the geographical service area. If a destination point is outside of the geographical service area, the flight corridor must leave the geographical service area at a POI 120 towards an adjacent service area. If the starting point is outside of the geographical service area, the flight corridor must enter the geographical service area at a POI 120 from an adjacent service area. If both, starting and destination point are outside, the UAV 10 just transits the geographical service area. In this case as shown in FIG. 4, there is a service area 450 where the UAV 10 starts, two transit service areas 480, and a service area 490 where the destination is located. The UAV 10 passes between the service areas at POIs.

In such scenario, there are four UAV-AS involved in the allocation of the end-to-end flight corridor, one for each involved service area. When receiving a request for allocation of a flight corridor at the UAV-AS of the service area start 450, that UAV-AS determines that the destination point is outside of the own geographical service area. The UAV-AS then determines an adjacent geographical service area for providing a continuation of the flight corridor towards the destination point. Then the UAV-AS sends a request to an UAV-AS responsible for the determined adjacent geographical service area for allocation a flight corridor for use by the UAV 10. The request comprises a preferred POI 120 towards the determined adjacent geographical service area as starting point, and the destination point.

In this way, the allocation request is cascaded into forward direction, until a UAV-AS determines, that the destination point is within the own geographical service area, i.e. the service area destination 490. Then the UAV-AS in the service area destination 490 allocates a flight corridor, from the entry POI 120 to the destination point, and returns it as result in the response to the previous transit UAV-AS. That one allocates a flight corridor from the entry POI 120 to the exit POI and returns it as result in the response to the previous transit UAV-AS, and so on. When the response reaches the UAV-AS of the service area start 450, a flight corridor from the exit POI 120 to the destination point has been allocated. Now the UAV-AS of the service area start 450 allocates a flight corridor from the start point to the exit POI 120 and returns that as entire end-to-end flight corridor to the requestor. Thus, the entire end-to-end flight corridor may be allocated by a single request to the UAV-AS of the service area start 450.

As an alternative to this, a UAV 10 (or the operator thereof) may request allocation of a flight corridor from the UAV-AS of the service area start 450, and the UAV-AS allocates a flight corridor up until the POI 120 and returns it to the requestor. Then the UAV 10 starts the flight mission and moves up to, or close to the POI 120. Then the UAV 10 (or the operator thereof) may request allocation of a flight corridor from the UAV-AS of the adjacent service area 480, and so on. Thus, the flight corridor is requested hop-by-hop on demand shortly before the UAV 10 enters a new service area.

Both ways have advantages and drawbacks and may be used alternatively. These methods may also be used in combination in one flight mission, where certain segments of the mission path are pre-allocated, and others are requested right before the border is reached. The UAV-AS may also indicate a preference for the method to a UAV 10 (or the operator thereof) at initial registration of the UAV 10 at the UAV-AS 100. Between UAV-AS of different geographical service areas, the allocation method may also be negotiated, and vary on the time of the day, day of the week, or UAV traffic density in the service area, and so on.

Figure 5:
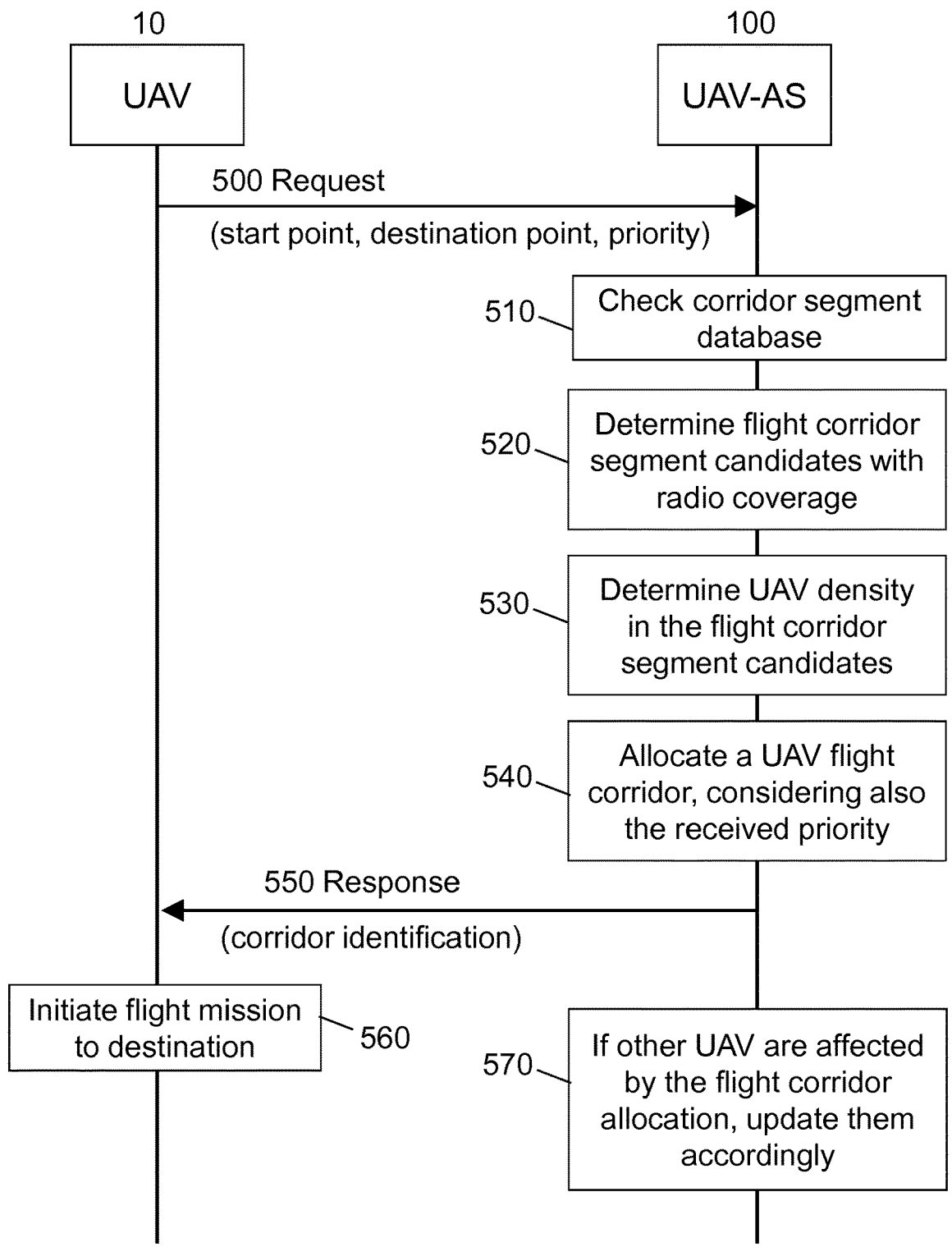
FIG. 5 shows a flow diagram between a UAV and a UAV-AS for allocating a flight corridor within a single service area for use by an UAV for traveling from a starting point to a destination point.

Referring to FIG. 5, this figure shows a flow diagram between a UAV and a UAV-AS for allocating a flight corridor for use by an UAV for traveling from a starting point to a destination point.

This figure shows a scenario where a UAV 10 is requesting allocation of a flight corridor from a UAV-AS 100. The UAV 10 may initiate such request before leaving the current position for a flight mission. The current position may be any spot where the UAV 10 is waiting for new mission instructions (e.g. a landing point), or a spot where the last flight missing was accomplished and the UAV 10 is idle and able to take on a new flight mission. In this case, the UAV-AS 100 is the UAV-AS being responsible for the geographical position where the UAV 10 is located, so the geographical service area where the UAV 10 is currently positioned.

By alternative, the UAV 10 may initiate such request just before leaving the current geographical service area and entering an adjacent geographical service area. In this case the UAV 10 is moving in a flight corridor and approaching a POI towards an adjacent geographical service area. Before entering the adjacent geographical service area, the UAV 10 must request allocation of a flight corridor in the adjacent geographical service area in order to know which path to take. In this case, the UAV 10 may send a request to the UAV-AS 100 being responsible for the adjacent geographical service area. The UAV 10 may determine the UAV-AS 100 being responsible for the adjacent geographical service area by information received from the cellular network or from the current UAV-AS 100 the UAV 10 is currently assigned to. The UAV 10 may also derive the adjacent geographical service area from the POI, or from the adjacent geographical service area derive the responsible UAV-AS.

The flow starts in step 500 when the UAV 10 sends a request message to the UAV-AS 100. The request comprises a start point, a destination point, and optionally a priority indication. The start point may either be the current location of the UAV 10, or the POI towards an adjacent geographical service area. The destination point may correspond to the destination of the flight mission. The priority indication may be present to indicate a priority of the flight mission. For example, the flight mission may be related to some emergency, and therefore the flight mission shall be allocated considering such priority. Or, some goods to be transported by the flight mission require special attention, or the operator of the UAV 10 is paying a premium for getting priority handling at the allocation of a flight corridor.

The UAV-AS 100 is receiving a request message 500 for allocation of a flight corridor. The request comprises a start point, a destination point, and optionally a priority indication. If no such priority indication is received, the UAV-AS 100 may assume a default priority. By alternative (not depicted) the UAV-AS 100 may in this case send a query for the priority to an operator of the UAV 10.

In a first check 510, the UAV-AS 100 may check with a corridor segment database for the latest status of the corridor segments in the service area. The database may comprise in addition to information on the coverage of the cellular network per flight corridor segment, current radio conditions, weather conditions, failure or maintenance activities, or load in the flight corridor segments, the load being related to a number of UAV 10 located in the flight corridor segment.

The UAV-AS 100 may update the database of flight corridor segments in case of changes of the cellular network coverage, the changes comprising one or more of cellular network failures, planned maintenance, radio interferences, and weather conditions.

In the next step 520, the UAV-AS 100 may determine flight corridor segment candidates comprising radio coverage, thus UAV 10 is under seamless control of the UAV-AS 100 via a connectivity provided by the seamless coverage of the cellular network. Control of the UAV 10 may comprise steering or position verification of the UAV 10 by the UAV-AS 100.

In the next step 530, the UAV-AS 100 may determine UAV 10 density in the flight corridor segment candidates.

Then, in step 540, the UAV-AS 100 may allocate a UAV flight corridor, considering also the received priority. For this allocation, the UAV-AS takes into account the above described parameters in relation to the determined or received priority. For high priority flight missions, the UAV-AS 100 may also change the allocated flight corridor of other UAV 10 in the service area. E.g., in order to preempt a flight corridor, other UAV 10 may be instructed to temporarily land or interrupt their current flight mission or are instructed to take a different flight corridor, different flight corridor segment, a different height, or position within the flight corridor.

In step 550 the UAV-AS 100 sends a response to the request to the requestor, in this example to the UAV 10. The response comprises an identification of the allocated flight corridor. The information of the allocated flight corridor may be coded in different formats. A flight corridor is a concatenation of one or more flight corridor segments. In one way, all possible concatenation of flight corridor segments may be predetermined in a table and numbered. In this case, the identification of the allocated flight corridor may simply be that number of the table entry, assuming that such table is commonly known by the UAV and the UAV-AS. Alternatively, the allocated flight corridor may be coded as a sequence of flight corridor segments, assuming that the flight corridor segments are commonly known by the UAV and the UAV-AS. Yet alternatively, the flight corridor may be coded as a sequence of GPS coordinates that the UAV must sequentially pass. In this case, there is no need for the UAV to know about flight corridors or flight corridor segments. The actual form of indication is not relevant, as long as the identifier allows the UAV to determine a flight path to the destination point.

The UAV 10 receives a response to its request in step 500. The response comprises an identification of the allocated flight corridor. The identification of the allocated flight corridor may have different formats as described above.

In step 560 the UAV 10 initiates the flight mission along the allocated flight corridor from the starting point to the destination point.

Optionally, in step 570, the UAV-AS 100 instructs other affected UAV 10 that are affected by the allocation of the flight corridor, as described above.

Figure 6:
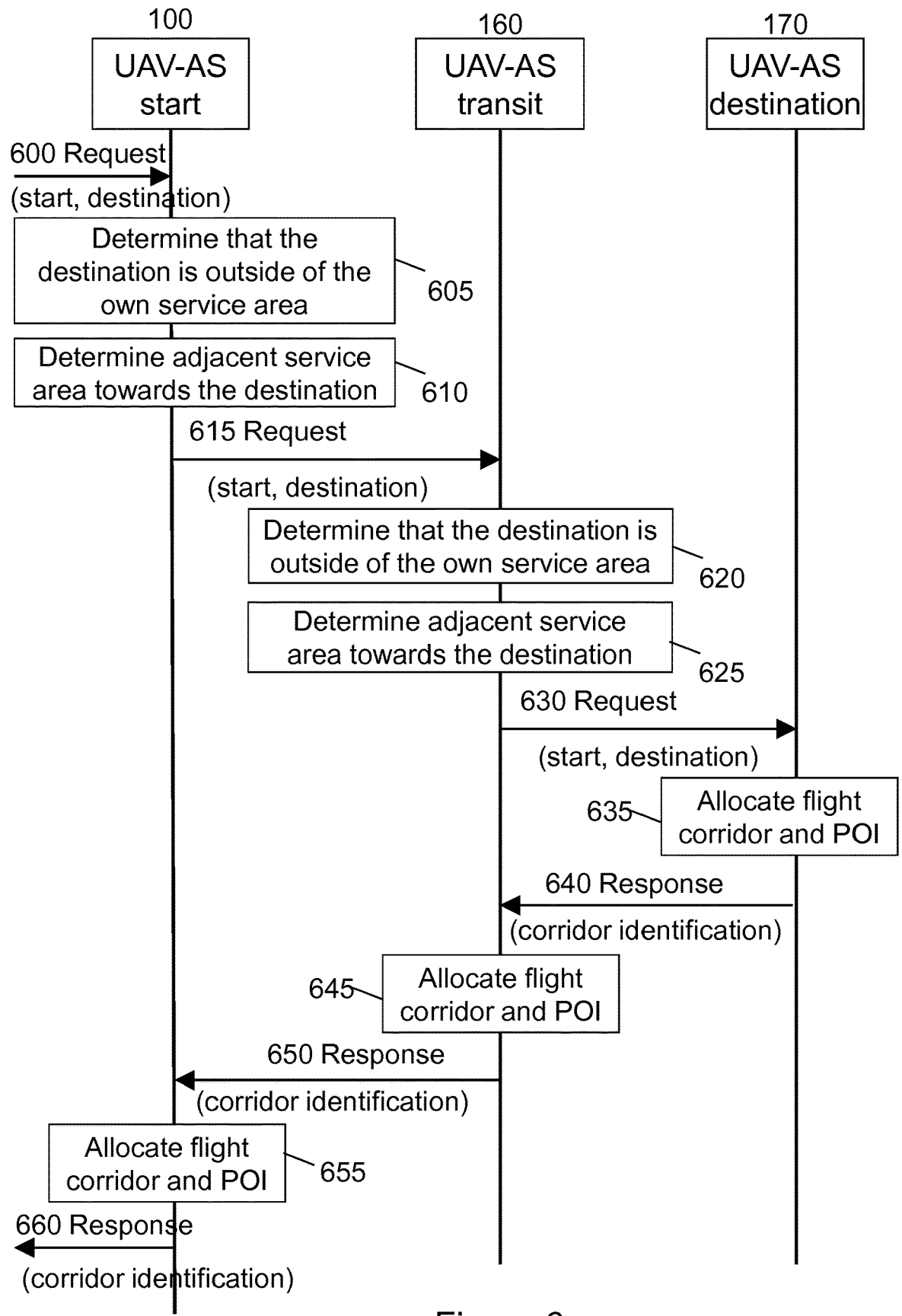
FIG. 6 shows a flow diagram between UAV-AS in the starting service area, a UAV-AS in a transit service area, and a UAV-AS in a destination service area for allocating a flight corridor for use by an UAV for traveling from a starting point to a destination point.

Referring to FIG. 6, this figure shows a flow diagram between UAV-AS in the starting service area, a UAV-AS in a transit service area, and a UAV-AS in a destination service area for allocating a flight corridor for use by an UAV for traveling from a starting point to a destination point.

This scenario corresponds to FIG. 4 but using just one transit service area for simplicity. The flow starts in step 600 with the UAV-AS 100 receiving a request message for allocation of a flight corridor. The request 600 comprises a start point, a destination point, and optionally a priority indication (not depicted, as described for FIG. 5). The request may originate from a UAV 10 directly, or from an operator of such UAV 10. The request message 600 may be the same as the request message 500 in FIG. 5.

In step 605 the UAV-AS 100 determines that the received destination is located outside of the own service area of the UAV-AS 100. If that is the case, the UAV-AS 100 determines in step 610 an adjacent service area, that can be used towards the destination. The UAV-AS may have information stored on which adjacent service areas there are and which of those to use for certain destinations. In absence of such information for a particular destination, the adjacent service area may be selected based on a direction which leads towards the destination. E.g. if a destination is located towards north of the own service area, an adjacent service area located north of the own service area may be determined. In addition, only adjacent service areas are to be considered, towards which at least one POI is defined. Once the adjacent service area is determined, the UAV-AS 170 of that adjacent service area is determined. This may be done by using well known discovery mechanisms, e.g. DNS query on well-known name or by preconfigured information in the UAV-AS 100. The UAV-AS 100 may maintain a table of UAV-AS 160 addresses of all adjacent service areas.

In step 615 the UAV-AS 100 sends a request message for allocation of a flight corridor to the UAV-AS 160 of the transit service area. The request 615 comprises a start point, a destination point, and optionally a priority indication (not depicted, as described for FIG. 5). The starting point may be set to a POI to that transit service area, the destination is the destination as received in step 600.

The UAV-AS 160 of the transit service area receives the request message 615. The UAV-AS 160 performs in steps 620 and 625 similar checks and actions as described in steps 605 and 610. The UAV-AS 160 determines that the destination is outside of the own service area, determines an adjacent service area towards the destination, and a UAV-AS 170 of that determined adjacent service area. The UAV-AS 160 then sends in step 630 a request message for allocation of a flight corridor to the UAV-AS 170 of the destination service area. The request 630 comprises a start point, a destination point, and optionally a priority indication (not depicted, as described for FIG. 5). The starting point may be set to a POI to that destination service area, the destination is the destination as received in step 615.

The UAV-AS 170 of the destination service area receives the request message 630. The request 630 comprises a start point, a destination point, and optionally a priority indication (not depicted, as described for FIG. 5). Since in this example scenario the destination lies within that service area, the UAV-AS 170 determines that the destination point is within the own service area. The UAV-AS 170 may then in step 635 allocate a flight corridor for use within the destination service area, and a POI to be used towards the previous transit service area. In fact, the UAV-AS 170 of the destination service area may perform the same steps as depicted in FIG. 5 the UAV-AS 100, steps 510-540. Here the UAV-AS 170 returns the response message 640 to the requesting transit UAV-AS 160, the response comprising the allocated flight corridor in the destination service area.

The transit UAV-AS 160 receives the response 640 from the destination UAV-AS 170 and the allocated flight corridor in the destination service area. Then in step 645 the transit UAV-AS 160 may allocate a flight corridor in the transit service area (same steps as in 510-540) and a POI towards the start service area. Then the transit UAV-AS 160 returns response message 650 to the requesting start UAV-AS 100. The response 650 comprises the flight corridor allocated in the destination service area and the flight corridor allocated in the transit service area.

The start UAV-AS 100 receives the response 650 from the transit UAV-AS 160 and the allocated flight corridor in the destination and transit service areas. Then in step 655 the start UAV-AS 100 allocates a flight corridor in the start service area (may be the same steps as in 510-540), from the starting point to the selected POI towards the transit service area.

Finally, a response message 660 is returned to the requesting UAV 10, the response message 660 comprising an identification of the entire allocated flight corridor, from the starting point, via the transit service area, and to the destination in the destination service area.

Figure 7:
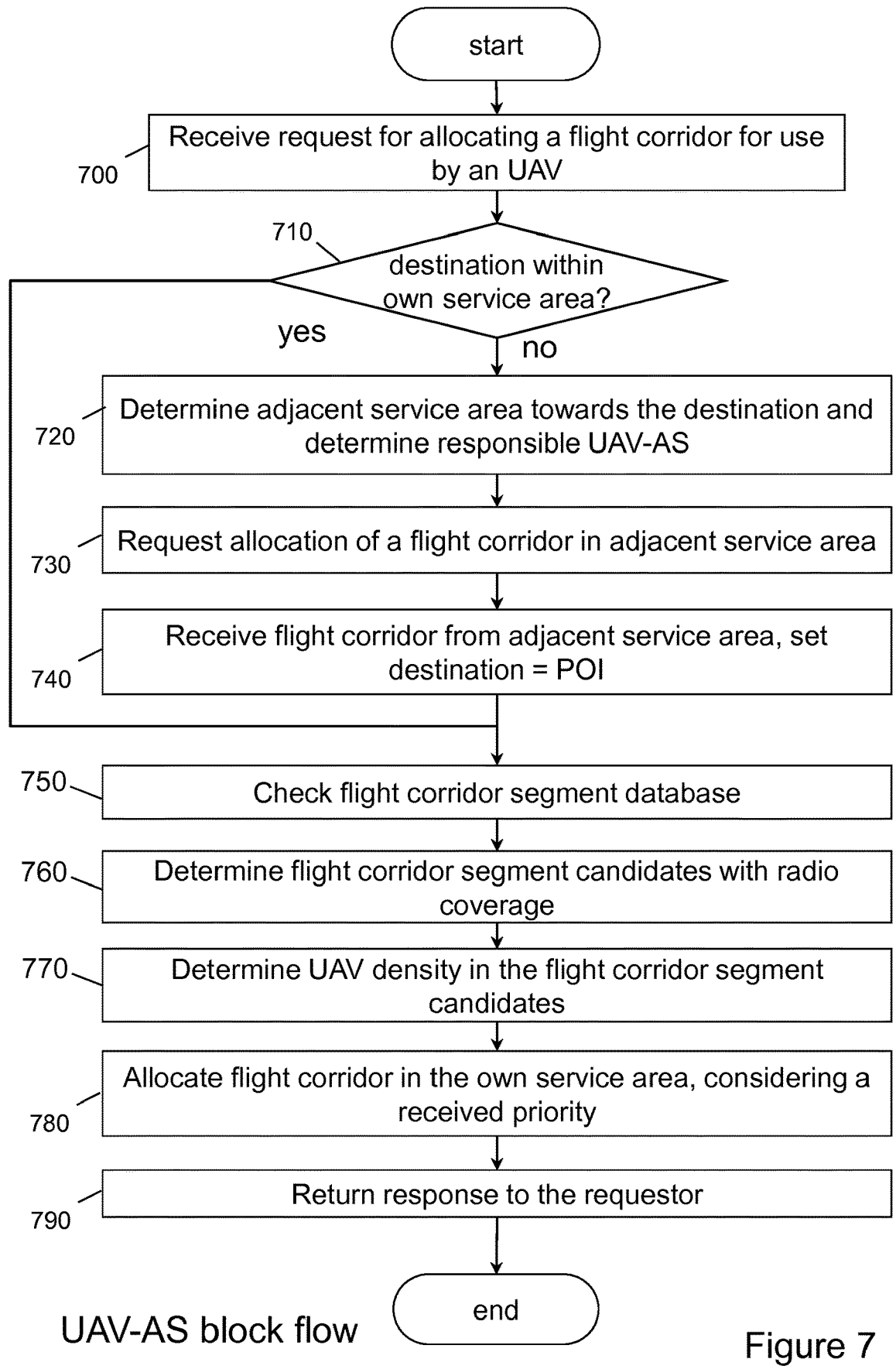
FIG. 7 shows a block diagram in a UAV-AS for allocating a flight corridor for use by an UAV for traveling from a starting point to a destination point.

Referring to FIG. 7, this figure shows a block diagram in a UAV-AS for allocating a flight corridor for use by an UAV 10 for traveling from a starting point to a destination point. The UAV-AS may correspond to an UAV-AS 100, 160, 170 as shown in the previous figures.

The flow starts in step 700, when the UAV-AS receives a request for allocating a flight corridor for use by an UAV.

Such request may originate from a UAV located at a landing position and heading for a flight mission, or from a UAV-AS of an adjacent geographical service area, or from an operator of a UAV. The request message comprises a start point, a destination point, and optionally a priority indication. The request may be the request message 500 or 600.

In step 710 the UAV-AS checks the destination point and determines whether the destination is within the own service area or not. If the destination is within the own service area, the flow continues in step 750. If the destination is not within the own service area the flow continues in step 720.

Step 720 is performed if the destination is not within the own service area. Then the UAV-AS determines an adjacent service area that can be used by the UAV to reach the indicated destination point. The UAV-AS may have information stored on which adjacent service areas there are and which of those to use for certain destinations. In absence of information for the destination, the adjacent service area may be selected based on a direction which leads towards the destination, e.g. if a destination is located towards south of the own service area, an adjacent service area located south of the own service area may be determined. In addition, only adjacent service areas may be be selected, towards which at least one POI is defined.

Then the UAV-AS may determine the responsible UAV-AS responsible for the determined adjacent service area. The UAV-AS may use a well-known discovery mechanism such as DNS query on a well-known name, or by preconfigured information in the UAV-AS. For this purpose, the UAV-AS may maintain a table of neighboring/adjacent UAV-AS addresses of all adjacent service areas.

In step 730 the UAV-AS sends a request message to the determined UAV-AS responsible for the determined adjacent service area, requesting allocation of a flight corridor for use by the UAV. The request comprises a starting point set to a POI to the determined adjacent service area, a destination point set to the destination point as received in step 700, and optionally a priority indication set to the priority indication as received in step 700.

In step 740 the UAV-AS receives a response to the request sent in step 730. The response message comprises an indicator of a flight corridor allocated from the POI towards the destination point. The indicator of a flight corridor may have a format as described for step 550. The UAV-AS further on uses the POI as indicated in the allocated flight corridor indication as destination point for use in the further steps.

Step 750 is performed if the destination is within the own service area, or as a step after step 740. In step 750 the UAV-AS checks the flight corridor segment database, where preconfigured flight corridor segments defined in the own service area are stored. The UAV-AS may check with a corridor segment database for the latest status of the corridor segments in the own service area. The database may comprise information on the coverage of the cellular network per flight corridor segment, current radio conditions, weather conditions, failure or maintenance activities, or load in the flight corridor segments, the load being related to a number of UAV located in the flight corridor segment.

In step 760 the UAV-AS determines flight corridor segment candidates that comprise a seamless radio coverage. A seamless radio coverage allows the UAV-AS to seamlessly control the UAV via a connectivity provided by the seamless coverage of the cellular network. Control of the UAV may comprise steering or position verification of the UAV by the UAV-AS. Thus, flight corridor segment that are not seamlessly covered by radio coverage are not considered for a candidate lists of possible flight corridor segments.

In step 770 the UAV-AS further reduces the number of possible flight corridor segments by considering the density of UAV flights in the remaining flight corridor segment candidates.

Then, in step 780, the UAV-AS allocates a UAV flight corridor, from the starting point to the destination point, for use by the UAV. The destination point may either be the POI to the adjacent service area (if the destination is outside of the own service area) or the real destination point (if within the own service area). Well-known algorithms may be applied to determine a path within a set of given segments, for example selecting a shortest path (where a length tag is attached to each segment), a path accumulating a least cost (where a price tag is attached to each segment), or a shortest trip time (where a time tag is attached to each segment).

Based on the short list of remaining flight corridor segments, the current UAV flight density, a received priority of the UAV flight mission, and optionally more parameters available from the flight corridor segment database or the operator of the UAV, the UAV-AS determines a flight corridor. For high priority flight missions, the UAV-AS may also change the allocated flight corridor of other UAV in the service area. E.g., in order to preempt a flight corridor, other UAV may be instructed to temporarily land or interrupt their current flight mission or are instructed to take a different flight corridor, different flight corridor segment, a different height, or position within the flight corridor. After a flight corridor has been determined, the UAV-AS allocates it for use by the UAV. Allocation may mean that a capacity of the used flight corridor segments is reserved for use by the UAV. The UAV-AS then appends the received flight corridor received from the adjacent service area to the allocated flight corridor in the own service area, resulting in an end-to-end flight corridor from the starting point to the destination point.

Finally, in step 790, a response is returned to the requestor. The response message comprises an indication of the final allocated flight corridor, end-to-end, from the starting point to the destination point.

Figure 8A:
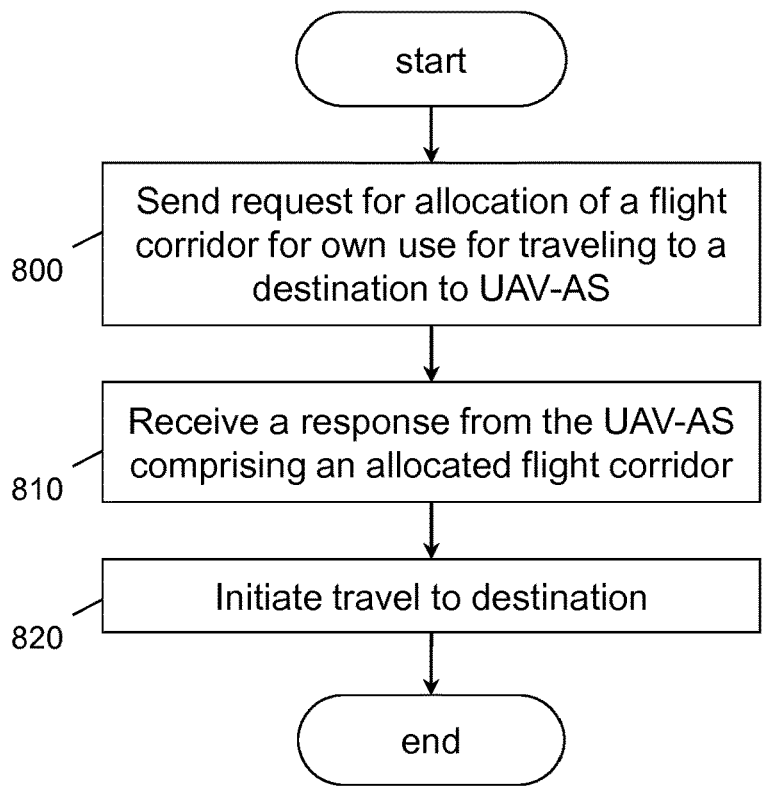
FIGS. 8a/b show block diagrams in a UAV for allocating a flight corridor for use by an UAV for traveling from a starting point to a destination point.

Referring to FIG. 8a/b, these figures show block diagrams in a UAV for allocating a flight corridor for use by an UAV for traveling from a starting point to a destination point. The UAV may correspond to an UAV 10 as shown in the previous figures.

FIG. 8a shows a flow where a UAV requests the allocation of a flight corridor from a starting point to a destination point. The flow starts in step 800 when the UAV sends a request, to the UAV-AS to which the UAV is associated with, for allocation of a flight corridor for own use for traveling to a destination point. This step may be triggered by an instruction from an operator of the UAV to take on a flight mission. The request message comprises a starting point and a destination point of the flight mission. Optionally the request may indicate a priority of the flight mission.

In step 810 the UAV receives a response from the UAV-AS comprising an indication of an allocated flight corridor. Based on this flight corridor, the UAV then starts in step 820 the flight mission towards the destination point along the allocated flight corridor. The indication of the allocated flight corridor may have to be converted first into a set of intermediate positions to travel by or a series of movement patterns.

Figure 8B:
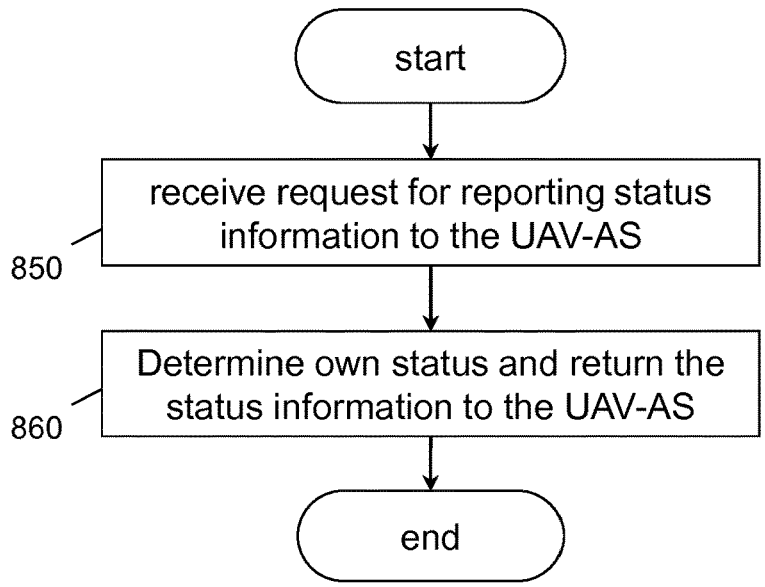

FIG. 8b shows a flow where the UAV receives a request for reporting own status information. The flow starts in step 850 when the UAV receives a request for reporting status information to a requesting UAV-AS.

In step 860 the UAV determines the own status and return the status information to the requesting UAV-AS.

Status information may comprise information characterizing the status of the UAV, for example the own current geographical position, an estimated time for arrival at the destination point, an estimated time for leaving the geographical service area the requesting UAV-AS is responsible for, an own traveling speed, a quality of the connection to the cellular network, or an own health condition.

Such status information may also be reported by the UAV at periodical intervals (not depicted), for example on request by the UAV-AS setting such periodical interval. Alternatively, the UAV-AS my instruct the UAV to send such report if a certain event has happened, wherein the UAV-AS would define the event in the request (not depicted). For example, the UAV-AS may instruct the UAV to send a report when the radio conditions fade, or if a delay of the flight mission reaches a critical threshold (e.g. front wind reducing a planned travel speed).

Figure 9:
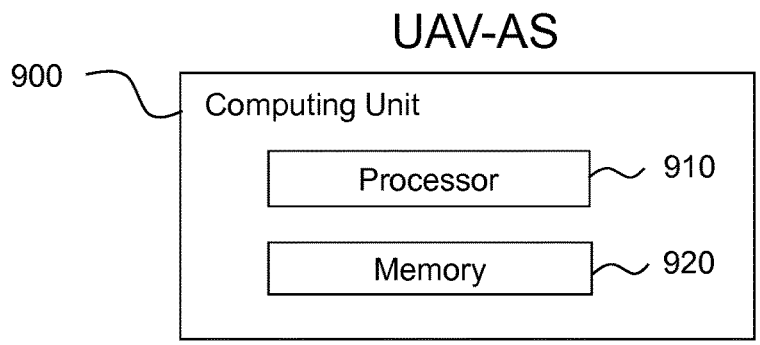
FIG. 9 shows an exemplary composition of a computing unit configured to execute a UAV-AS according to the present disclosure.

Referring to FIG. 9, this figure shows an exemplary composition of a computing unit configured to execute a UAV-AS according to the present disclosure. The UAV-AS may correspond to an UAV-AS 100, 170 as shown in the previous figures.

The computing unit 900 comprises at least one processor 910 and at least one memory 920, wherein the at least one memory 920 contains instructions executable by the at least one processor 910 such that the computing unit 900 is operable to carry out the method steps described in FIG. 7 with reference to the UAV-AS 100, 160, 170.

Figure 10:
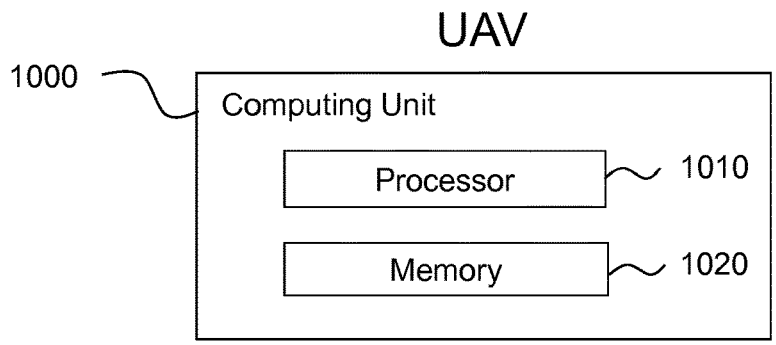
FIG. 10 shows an exemplary composition of a computing unit configured to execute a UAV according to the present disclosure.

Referring to FIG. 10, this figure shows an exemplary composition of a computing unit configured to execute a UAV according to the present disclosure. The UAV may correspond to an UAV 10 as shown in the previous figures.

The computing unit 1000 comprises at least one processor 1010 and at least one memory 1020, wherein the at least one memory 1020 contains instructions executable by the at least one processor 1010 such that the computing unit 1000 is operable to carry out the method steps described in FIG. 8*a*/*b* with reference to the UAV 10.

It will be understood that the computing units 900 and 1000 may be physical computing units as well as virtualized computing units, such as virtual machines, for example. It will further be appreciated that the computing units may not necessarily be implemented as standalone computing units but may be implemented as components—realized in software and/or hardware—residing on multiple distributed computing units as well.

Figure 11:
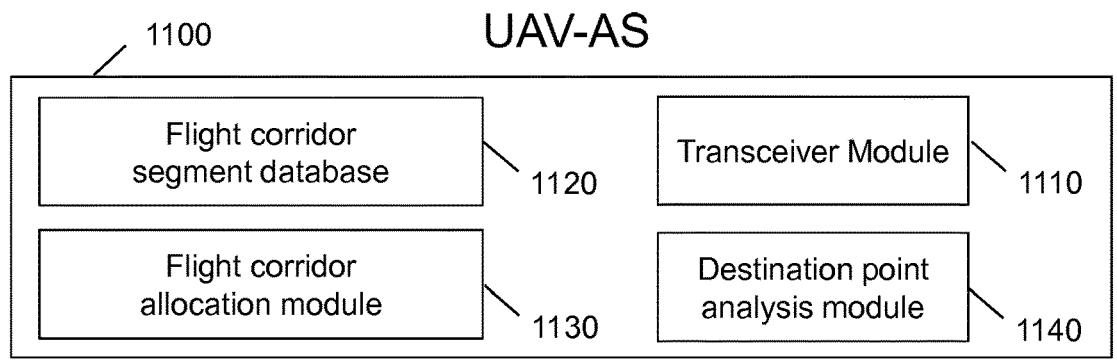
FIG. 11 shows an exemplary modular function composition of a computing unit configured to execute a UAV-AS according to the present disclosure.

Referring to FIG. 11, this figure shows an exemplary modular function composition of a computing unit configured to execute a UAV-AS according to the present disclosure. The UAV-AS may correspond to an UAV-AS 100, 160, 170 as shown in the previous figures.

The Transceiver Module 1110 may be adapted to perform reception and sending of request/response messages, such as step 700, 730, 740, 790, and any signaling messages related to the allocation of a flight corridor to a UAV.

The Flight Corridor Segment Database 1120 may be adapted to store preconfigured flight corridor segments defined in the own service area. The corridor segment database may be consulted for the latest status of the corridor segments in the own service area. The database may comprise information on the coverage of the cellular network per flight corridor segment, current radio conditions, weather conditions, failure or maintenance activities, or load in the flight corridor segments, or what capacity has currently been dedicated to flight missions with already allocated flight corridor. The UAV-AS may keep the database up to date when condition change or new information is received by the UAV-AS.

The Flight Corridor Allocation Module 1130 may be adapted to determine on request a flight corridor that best meets the request demands and the current situation in the flight segments as represented in the Flight Corridor Segment Database 1120. Once a flight corridor is determined, the Flight Corridor Allocation Module 1130 also allocates the flight corridor to the UAV by reserving capacity in the respective flight corridor segments in the Flight Corridor Segment Database 1120.

The Destination Point Analysis Module 1140 may be adapted to determine, based on a given destination point, whether the destination is still within the own service area, or outside of the own service area. If the destination is outside of the own service area, the module may determine an adjacent service area towards the destination and a POI towards that adjacent service area. In addition, this module may determine a UAV-AS being responsible for that determined adjacent service area and an address of that UAV-AS to be used for request messages.

Figure 12:
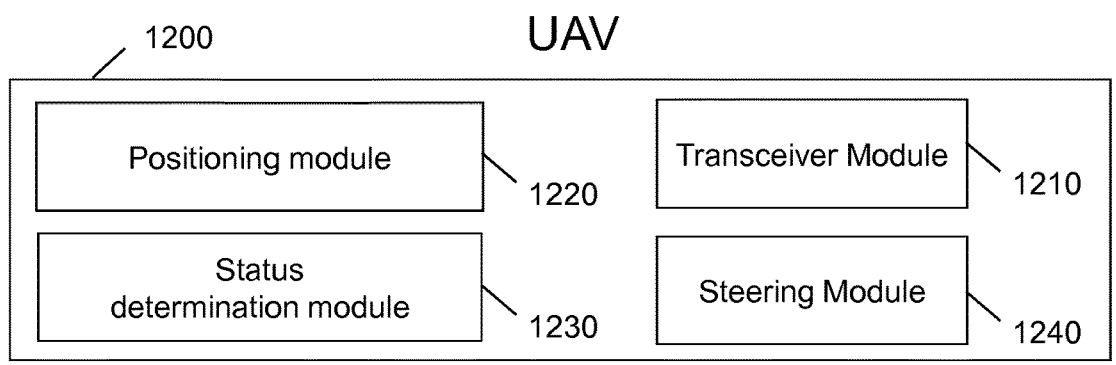
FIG. 12 shows an exemplary modular function composition of a computing unit configured to execute a superior UAV according to the present disclosure.

Referring to FIG. 12, this figure shows an exemplary modular function composition of a computing unit configured to execute a superior UAV according to the present disclosure. The UAV may correspond to an UAV 10 as shown in the previous figures.

The Transceiver Module 1210 may be adapted to perform reception and sending of request/response messages, such as step 800, 810, 850, 860, and any signaling messages related to the allocation of a flight corridor to a UAV.

The Positioning Module 1220 may be adapted to determine the current own position of the UAV, e.g. the GPS coordinates and a height. The module may also determine its position based on triangulation of known radio transmitter and a perceived radio strength. The module may also utilize positioning services of the cellular network to determine the own position. Depending on the accuracy needs, different positioning methods may be used to complement each other, to verify the result, or to shorten the determination time.

The Status Determination Module 1230 may be adapted to collect and calculate the status information that is requested by a UAV-AS, that has to be reported to a UAV-AS periodically, or that has to be monitored in order to report certain events to a UAV-AS. Based on the results provided by the Positioning Module 1220, this module can determine speed, heading, time to reach the destination, and so on.

The Steering Module 1240 is adapted to control the UAV movement along a given flight corridor. The module may use data from the Positioning Module 1220 and sensors to determine corrective actions for the UAV to move in accordance with the requirements of an allocated flight corridor.

Figure 13:
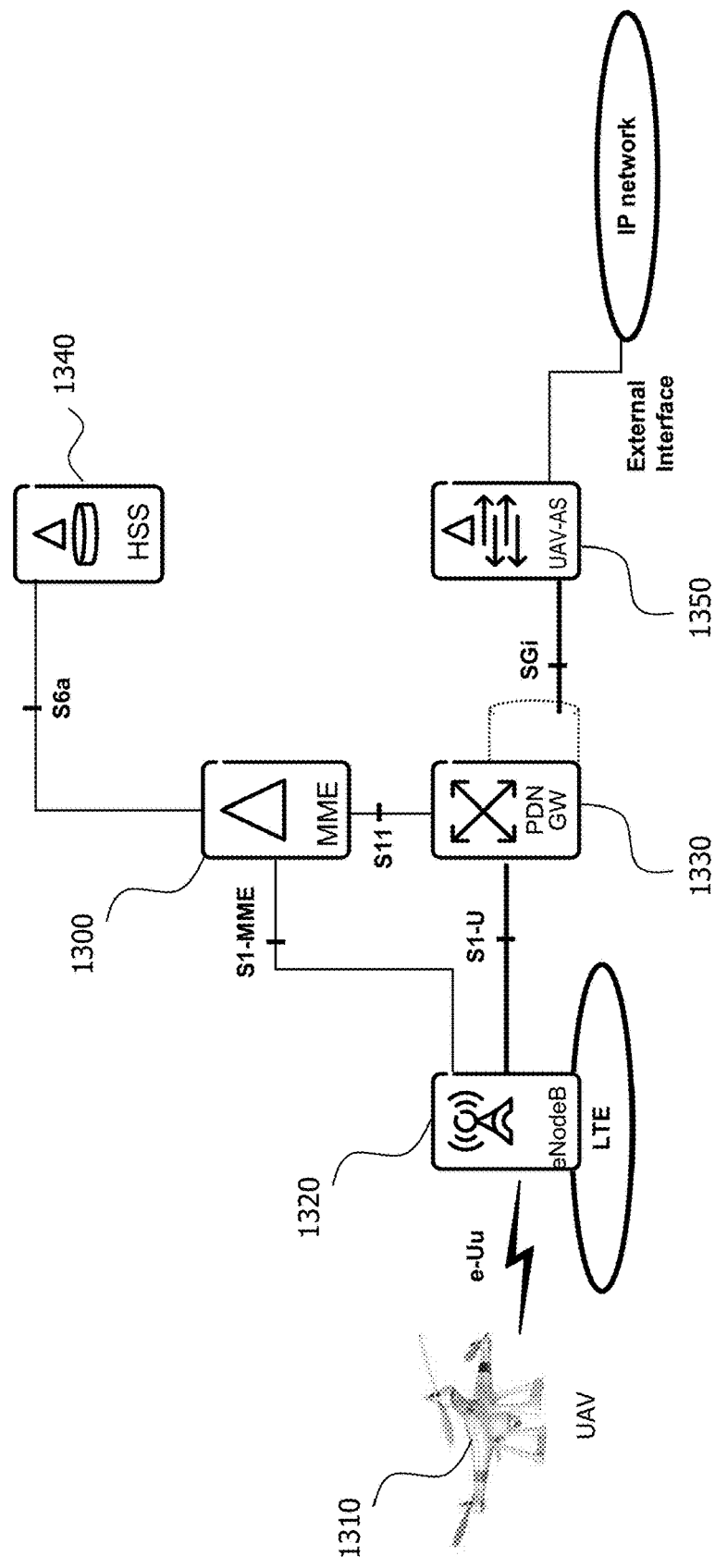
FIG. 13 illustrates an exemplary cellular network architecture for LTE including a UAV and UAV-AS, which may be used according to the present disclosure.

Referring to FIG. 13, this figure illustrates exemplary cellular network architecture for LTE including a UAV and UAV-AS, which may be used according to the present disclosure.

A radio coverage area of an LTE network is based on tracking areas. In such example, the geographical service area a UAV-AS is responsible for, may be constructed from one or more tracking areas of the LTE radio network. The UAV may comprise a LTE-radio module (and a type of subscriber identity module, SIM, card) which is used to register the UAV into the packet core network of the network operator. Once being registered, or as part of the registration procedure, the UAV may discover the UAV-AS being responsible for the current geographical service are. The normal mobility procedures of the packet core network are used to keep track on the mobility of the UAV. This architecture is sketched in this figure in more detail.

As common LTE architectures, the architecture shown in this figure comprises an eNodeB 1320 through which the UAV 1310 may connect to the cellular network using an e-Uu interface. The eNodeB 1320 connects to a Mobility Management Entity, MME, 1300 for control plane support using an S1-MME interface and to a Packet Data Network Gateway, PDN GW, 1330 for user plane support (i.e., for user data transfer) using an S1-U interface. The MME 1300, in turn, is connected to a Home Subscriber Service, HSS, 1340 containing user-related and subscription-related information via an S6a interface. It will be understood by the skilled person that the architecture shown in this figure corresponds to a simplified LTE architecture in which only those components that are necessary for the purpose of elucidating the technique presented herein are shown.

In addition to the above-described common entities of an LTE network, the architecture illustrated in this figure further comprises a UAV application server 1350 (denoted as "UAV-AS" in the figure) as part of the cellular communication network. The UAV-AS 1350 may correspond to the UAV-AS described in relation to the previous figures. The UAV-AS 1350 connects to the PDN GW 1330 through an SGi interface and supports an external interface which allows access to functions of the UAV-AS 1350 to entities external to the cellular communication network, such as entities accessing the UAV-AS 1350 from the Internet, or vice versa, for example.

Using the SGi interface to the packet core network, the UAV-AS can communicate with the UAV and vice versa. This allows to instruct a flight policy or corresponding actions to a UAV and to receive flight path information from the UAV in the UAV-AS. Via the interface to external networks such as the Internet, the UAV-AS is able to retrieve and provide information from an operator of the UAV, or to contact other UAV-AS of a hierarchical UAV-AS architecture.

Figure 14:
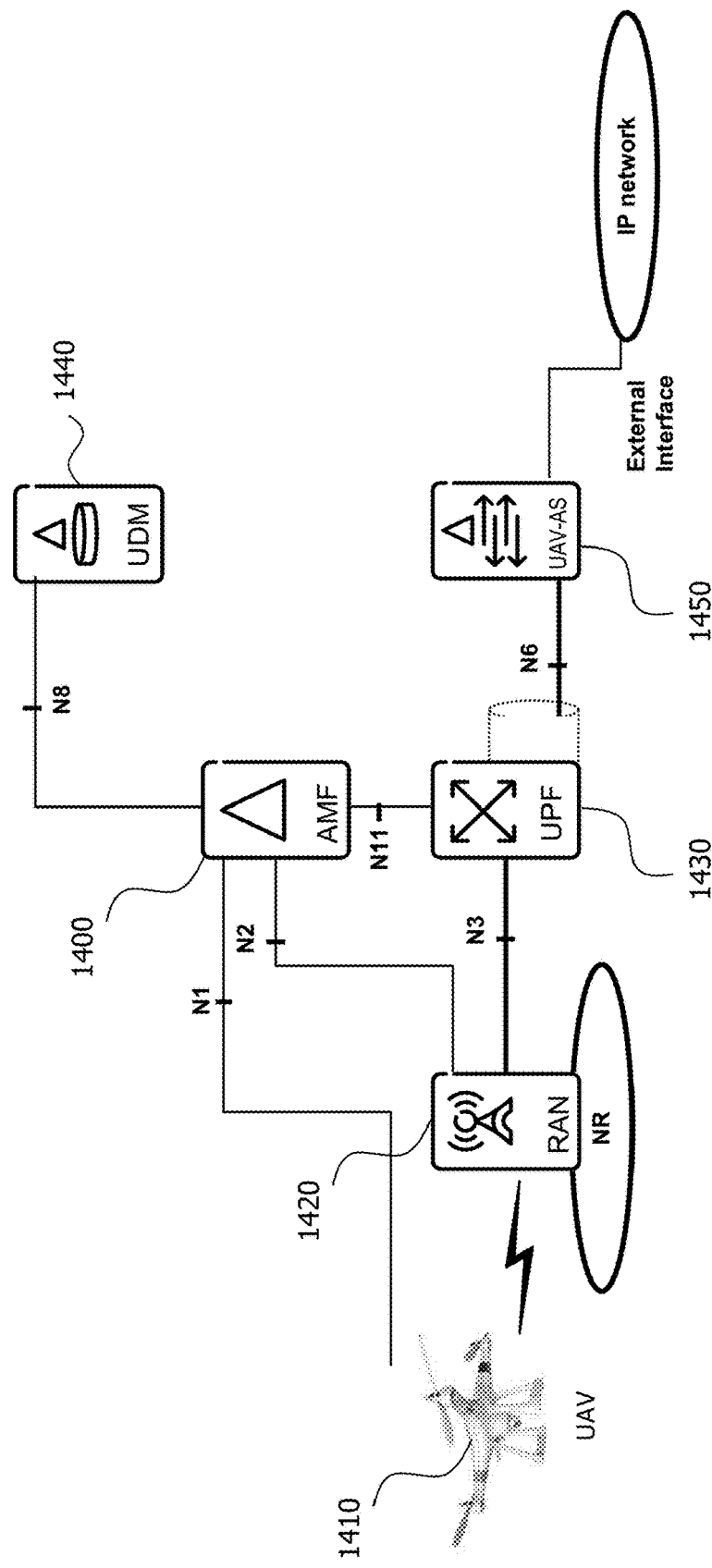
FIG. 14 illustrates an exemplary cellular network architecture for 5G including a UAV and UAV-AS, which may be used according to the present disclosure.

Referring to FIG. 14, this figure illustrates exemplary cellular network architectures for 5G including a UAV and UAV-AS, which may be used according to the present disclosure.

The architecture shown in this figure corresponds to a 5G variant of the architecture described in relation to FIG. 13. The basic principles for practicing the technique presented herein may equally apply to the 5G architecture of this figure. Unnecessary repetitions are thus omitted in the following. Only, it is noted that the functions described above for the eNodeB, the MME, the PDN GW and the HSS may in this case be performed by corresponding functions of the 5G architecture, i.e., the Radio Access Network, RAN, 1420, the Access and Mobility Function, AMF, 1400, the User Plane Function, UPF, 1430, and the User Data Management, UDM, 1440, respectively.

According to another embodiment, a computer program is provided. The computer program may be executed by the processors 910 or 1010 of the above-mentioned entities UAV-AS or UAV respectively such that a method for allocating a flight corridor for use by an UAV for traveling from a starting point to a destination point as described above with reference to FIG. 7, 8a, or 8b may be carried out or be controlled. The entities UAV-AS or UAV may be caused to operate in accordance with the above described method by executing the computer program.

The computer program may be embodied as computer code, for example of a computer program product. The computer program product may be stored on a computer readable medium, for example a disk or the memory 920 or 1020 of the UAV-AS/UAV or may be configured as downloadable information.

One or more embodiments as described above may enable at least one of the following technical effects:
- use of a cellular network for seamless control of UAVs in a geographical service area
- enables UAV flight density control in flight corridor segments and handling of UAV priority missions
- providing a system allowing full and seamless control of privately and commercially operated UAVs
- implement and comply with regulatory requirements that might be required by a national flight regulation authority on UAV usage Modifications and other embodiments of the disclosed invention will come to mind to one skilled in the art having the benefit of the teachings presented in the foregoing descriptions and the associated drawings. Therefore, it is to be understood that the embodiments are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. An unmanned aerial vehicle Application Server (UAV-AS) comprising:
    at least one processor and at least one memory, the at least one memory containing instructions executable by the at least one processor such that UAV-AS is operable to:
        receive a request for allocation of a flight corridor for use by an unmanned aerial vehicle (UAV) for traveling from a starting point to a destination point, the request comprising the starting point and the destination point, wherein the UAV is associated with the UAV-AS being responsible for an own geographical service area where the UAV is located, the UAV-AS maintaining a set of predetermined flight corridor segments in the geographical service area, wherein the request for allocation of a flight corridor is received from a UAV-AS responsible for an adjacent geographical service area;
        allocate a flight corridor being seamlessly covered by a cellular network to which the UAV is connected and allowing a seamless control of the UAV by the UAV-AS, the flight corridor comprising a concatenation of flight corridor segments and bridging the starting point and the destination point;
        send a response comprising an identifier of the allocated flight corridor; and
        control the UAV along the allocated flight corridor via connectivity provided by the seamless coverage of the cellular network.

2. The UAV-AS of claim 1, the at least one memory containing instructions executable by the at least one processor such that UAV-AS is operable to:
    determine whether the destination point in the request is located outside of the own geographical service area;
    if the destination point is located outside of the own geographical service area, determine an adjacent geographical service area for providing a continuation of the flight corridor towards the destination point; and
    send a request to an UAV-AS responsible for the determined adjacent geographical service area for allocation a flight corridor for use by the UAV, the request comprising a preferred point of interconnect (POI)

towards the determined adjacent geographical service area as starting point and the destination point.

3. The UAV-AS of claim 2, the at least one memory containing instructions executable by the at least one processor such that UAV-AS is operable to:
receive a response comprising an identifier of an allocated flight corridor; and
use the received allocated flight corridor as a flight corridor segment in the allocation of the flight corridor.

4. The UAV-AS of claim 1, the at least one memory containing instructions executable by the at least one processor such that UAV-AS is operable to:
determine whether the destination point in the request is located outside of the geographical service area the UAV-AS is responsible for;
if the destination point is located outside of the geographical service area, determine an Point of Interconnect, POI, to an adjacent geographical service area for providing a continuation of the flight corridor towards the destination point; and
use the determined POI as destination point for the allocation of a flight corridor.

5. The UAV-AS of claim 1, wherein the UAV is under seamless control of the UAV-AS via a connectivity provided by the seamless coverage of the cellular network, wherein control of the UAV comprises steering or position verification of the UAV.

6. The UAV-AS of claim 1, the at least one memory containing instructions executable by the at least one processor such that UAV-AS is operable to take into account a load in the flight corridor segments for determination of the flight corridor, the load being related to a number of UAV located in the flight corridor segments.

7. The UAV-AS of claim 1, the at least one memory containing instructions executable by the at least one processor such that UAV-AS is operable to take into account a priority of a UAV mission for determination of the flight corridor.

8. The UAV-AS of claim 1, the at least one memory containing instructions executable by the at least one processor such that UAV-AS is operable to:
maintain a database of flight corridor segments, the database comprising information on the coverage of the cellular network per flight corridor segment; and/or
maintain a database of UAV-AS responsible for adjacent geographical service areas, the database comprising addressing information on how to contact these UAV-AS.

9. The UAV-AS of claim 1, wherein the flight corridor allocated by the UAV-AS is included in a flight path for use by the UAV for traveling from the starting point to the destination point, wherein the flight path comprises a concatenation of multiple flight corridors in different geographical service areas for which different respective UAV-ASs are responsible.

10. A method for allocating a flight corridor for use by an unmanned aerial vehicle, UAV, for traveling from a starting point to a destination point, wherein the UAV is connected to a cellular network and associated with a UAV-Application Server, UAV-AS, being responsible for an own geographical service area where the UAV is located, the UAV-AS maintaining a set of predetermined flight corridor segments in the geographical service area, the method being performed by the UAV-AS and comprising:
receiving a request for allocation of a flight corridor for use by the UAV, the request comprising a starting point and a destination point, wherein the request for allocation of a flight corridor is received from a UAV-AS responsible for an adjacent geographical service area;
allocating a flight corridor being seamlessly covered by the cellular network and allowing a seamless control of the UAV by the UAV-AS, the flight corridor comprising a concatenation of flight corridor segments and bridging the starting point and the destination point;
sending a response comprising an identifier of the allocated flight corridor; and
controlling the UAV along the allocated flight corridor via connectivity provided by the seamless coverage of the cellular network.

11. The method of claim 10, further comprising:
determining whether the destination point in the request is located outside of the own geographical service area;
if the destination point is located outside of the own geographical service area, determining an adjacent geographical service area for providing a continuation of the flight corridor towards the destination point; and
sending a request to an UAV-AS responsible for the determined adjacent geographical service area for allocation a flight corridor for use by the UAV, the request comprising a preferred point of interconnect (POI) towards the determined adjacent geographical service area as starting point and the destination point.

12. The method of claim 10, further comprising:
receiving a response comprising an identifier of an allocated flight corridor; and
using the received allocated flight corridor as a flight corridor segment in the allocation of the flight corridor.

13. The method of claim 10, further comprising:
determining whether the destination point in the request is located outside of the geographical service area the UAV-AS is responsible for;
if the destination point is located outside of the geographical service area, determining an Point of Interconnect, POI, to an adjacent geographical service area for providing a continuation of the flight corridor towards the destination point; and
using the determined POI as destination point for the allocation of a flight corridor.

14. The method of claim 10, wherein the UAV is under seamless control of the UAV-AS via a connectivity provided by the seamless coverage of the cellular network, wherein control of the UAV comprises steering or position verification of the UAV.

15. The method of claim 10, further comprising taking into account a load in the flight corridor segments for determination of the flight corridor, the load being related to a number of UAV located in the flight corridor segments.

16. The method of claim 10, further comprising taking into account a priority of a UAV mission for determination of the flight corridor.

17. The method of claim 10, further comprising:
maintaining a database of flight corridor segments, the database comprising information on the coverage of the cellular network per flight corridor segment; and/or
maintaining a database of UAV-AS responsible for adjacent geographical service areas, the database comprising addressing information on how to contact these UAV-AS.

18. The method of claim 10, wherein the flight corridor allocated by the UAV-AS is included in a flight path for use by the UAV for traveling from the starting point to the destination point, wherein the flight path comprises a concatenation of multiple flight corridors in different geographical service areas for which different respective UAV-ASs are responsible.

\* \* \* \* \*